United States Patent
Hallock et al.

(10) Patent No.: US 11,607,979 B2
(45) Date of Patent: Mar. 21, 2023

(54) LENGTHWISE FASTENER

(71) Applicant: Lear Corporation, Southfield, MI (US)

(72) Inventors: Joshua Hallock, Warren, MI (US); Todd W. Waelde, Livonia, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/389,579

(22) Filed: Jul. 30, 2021

(65) Prior Publication Data

US 2023/0031408 A1    Feb. 2, 2023

(51) Int. Cl.
| | |
|---|---|
| *A47C 31/00* | (2006.01) |
| *A47C 31/02* | (2006.01) |
| *B60Q 3/00* | (2017.01) |
| *B60R 11/00* | (2006.01) |
| *B60N 2/58* | (2006.01) |

(52) U.S. Cl.
CPC ................ B60N 2/5825 (2013.01)

(58) Field of Classification Search
CPC ........ B60N 2/5825; B60N 2/58; A47C 31/023
See application file for complete search history.

(56) References Cited

U.S. PATENT DOCUMENTS

| | | | | |
|---|---|---|---|---|
| 1,794,159 A * | 2/1931 | Dinsmore | ................. | D03D 3/00 |
| | | | | 139/384 R |
| 3,940,812 A * | 3/1976 | DiForti | ..................... | A43B 9/00 |
| | | | | D6/606 |
| 5,989,373 A * | 11/1999 | Gangi | ....................... | B32B 3/04 |
| | | | | 156/93 |
| 6,450,678 B1 * | 9/2002 | Bayersdorfer | ............ | B60Q 3/51 |
| | | | | 362/581 |
| 8,215,810 B2 * | 7/2012 | Welch, Sr. | ............. | B60Q 3/217 |
| | | | | 362/501 |
| 8,662,583 B2 * | 3/2014 | Guadagno | ............ | B60N 2/5833 |
| | | | | 297/218.1 |
| 8,882,203 B2 * | 11/2014 | Takehara | .............. | B60N 2/5833 |
| | | | | 297/452.6 |
| 9,044,096 B2 * | 6/2015 | Tanaka | .................. | B60N 2/5883 |
| 9,440,582 B2 * | 9/2016 | Bayersdorfer | ............ | B60Q 3/64 |
| 9,703,029 B2 * | 7/2017 | Wenzel | ................... | G02B 6/001 |
| 10,076,983 B2 * | 9/2018 | Nishikido | ............ | B60N 2/5883 |
| 10,112,514 B2 * | 10/2018 | Lemarchand | ........ | B60N 2/5883 |
| 10,259,386 B2 * | 4/2019 | Unger | ..................... | B60Q 3/78 |
| 10,532,675 B2 * | 1/2020 | Booth | .................. | B60N 2/5825 |
| 10,576,852 B2 * | 3/2020 | Sasaki | .................... | A47C 31/02 |
| 10,836,308 B2 * | 11/2020 | Unger | .................... | G02B 6/001 |
| 11,096,436 B2 * | 8/2021 | Nishiyama | ............ | B60N 2/5891 |
| 11,220,195 B2 * | 1/2022 | Hering | ................... | B68G 7/105 |
| 2007/0035165 A1 * | 2/2007 | Zahel | .................... | B60N 2/5825 |
| | | | | 297/228.11 |
| 2015/0375654 A1 * | 12/2015 | Lemarchand | .......... | D05B 15/00 |
| | | | | 297/452.1 |
| 2016/0375807 A1 * | 12/2016 | Kageyama | ............... | B60N 2/58 |
| | | | | 297/452.61 |
| 2017/0088028 A1 * | 3/2017 | Nishikido | ............ | B60N 2/5883 |
| 2017/0151897 A1 * | 6/2017 | Nishikido | ................ | B60N 2/58 |
| 2019/0001877 A1 * | 1/2019 | Unger | ...................... | B60N 2/58 |
| 2019/0193631 A1 * | 6/2019 | Unger | ...................... | B60Q 3/64 |
| 2020/0123684 A1 * | 4/2020 | Nishimura | ............... | D03D 3/02 |

FOREIGN PATENT DOCUMENTS

FR    2935314 A1    3/2010

* cited by examiner

*Primary Examiner* — Shin H Kim

(74) *Attorney, Agent, or Firm* — Brooks Kushman P.C.

(57) ABSTRACT

A lengthwise fastener is fastened to a trim cover along a seam to provide piping exposed along the seam.

20 Claims, 4 Drawing Sheets

LENGTHWISE FASTENER

TECHNICAL FIELD

Various embodiments relate to lengthwise fasteners for vehicle seat assemblies.

BACKGROUND

Existing lengthwise fasteners are used in vehicle seat assemblies to secure seat covers/trim covers to a vehicle seat. Conventional zippers use interlocking teeth and a pull tab.

SUMMARY

According to an embodiment, a lengthwise fastener is fastened to a trim cover along a seam to provide piping exposed along the seam.

According to a further embodiment, the lengthwise fastener is provided with a first retainer with a lengthwise extended portion and a lengthwise concave portion.

According to a further embodiment, the lengthwise concave portion has a round cross-section with a range of at least 180 degrees.

According to another further embodiment, the concave portion has a distal end and an extended projection provided on the distal end.

According to another further embodiment, the lengthwise fastener is provided with a second retainer with a lengthwise extended portion and a lengthwise body portion sized to fit within the concave portion of the first retainer.

According to another further embodiment, a recess is formed along the lengthwise body portion and sized to receive the extended projection of the first retainer.

According to another even further embodiment, the lengthwise body portion has a round cross-section with a range of at least 180 degrees.

According to yet another further embodiment, the lengthwise body portion is connected to the lengthwise extended portion by an intermediate portion to space the body portion away from the concave portion of the first retainer.

According to another further embodiment, the second retainer of the lengthwise fastener is provided with an aperture through the lengthwise body portion for flexibility.

According to another further embodiment, a fastener tool is provided with a first guide sized to receive the first retainer of the lengthwise fastener for translation of the first guide relative to the first retainer. The fastener tool is also provided with a second guide sized to receive the second retainer for translation of the second guide relative to the first guide. The first guide and the second guide of the fastener tool converge so that translation of the first retainer and the second retainer along the first guide and the second guide directs the first retainer into fastened engagement with the second retainer.

According to another even further embodiment, the fastener tool is further provided with a first inlet of the first guide to receive the first retainer and a second inlet of the second guide to receive the second retainer.

According to another further embodiment, the fastener tool is provided with a single outlet of the combined first guide and the second guide.

According to yet another further embodiment, the first guide is provided with at least one roller to cooperate with the first retainer and the second guide is provided with at least one roller to cooperate with the second retainer.

According to yet another even further embodiment, the roller minimizes friction between the fastener tool and the first retainer and the second retainer.

According to another further embodiment, the first guide and the second guide are movable relative to each other.

According to another further embodiment, the fastener tool is provided with a locking mechanism that moves between an open position and a closed position that enables the fastener tool to open and close.

According to another embodiment, a trim cover assembly for a vehicle seat is provided with a trim cover for a seat bottom, a seat back or a head restraint, and a lengthwise fastener attached along a seam of the trim cover. The lengthwise fastener is fastened to the trim cover along the seam to provide piping exposed along the seam.

According to another further embodiment, the lengthwise fastener is provided with a first retainer with a lengthwise extended portion ad a lengthwise concave portion. The fastener is also provided with a second retainer with a lengthwise extended portion and a lengthwise body portion sized to fit within the concave portion of the first retainer. A trim cover is attached to the lengthwise fastener. The trim cover is formed with a first edge that is attached along a length of the first retainer, abutting the lengthwise concave portion. The trim cover is formed with a second edge that is spaced apart from and opposing the first edge, that is attached along a length of the second retainer and spaced from the lengthwise body portion to provide clearance for the lengthwise concave portion of the first retainer.

According to another embodiment, a trim cover assembly for a vehicle seat is provided with a trim cover for a seat bottom, a seat back or a head restraint, and a lengthwise fastener attached along a seam of the trim cover. The lengthwise fastener is fastened to the trim cover along the seam to provide piping exposed along the seam. The trim cover is disposed over the seat bottom of the seat back.

According to an embodiment, a method of fastening a lengthwise fastener receives a first retainer in a first guide of the fastener tool. A second retainer is received in a second guide of the fastener tool. The fastener tool is closed to engage the first retainer to the second retainer and moving the tool along a length of the first retainer and the second retainer to fasten the first retainer to the second retainer.

According to a further embodiment, the fastener tool is locked in an open position to receive the first retainer and the second retainer.

According to an even further embodiment, the fastener tool is unlocked prior to closing the fastening tool.

According to an embodiment, a vehicle seat assembly is provided with a seat bottom, a seat back extending upright from the seat bottom, and a head restraint oriented above the seat back. A trim cover is disposed over the seat bottom, the seat back, or the head restraint. A lengthwise fastener is provided to fasten the trim cover along a seam and to provide piping exposed along the seam. The lengthwise fastener is provided with a first retainer with a lengthwise extended portion and a lengthwise concave portion; and a second retainer with a lengthwise extended portion and a lengthwise body portion sized to fit within the concave portion of the first retainer. The concave portion of the first retainer and the body portion of the second retainer have a round cross-section with an arc of at least 180 degrees. The concave portion of the first retainer has a distal end and an extended projection provided on the distal end. The body portion of the second retainer is connected to the lengthwise extended portion by an intermediate portion to space the body portion away from the concave portion of the first retainer. The second retainer is also provided with an aperture through the body portion for flexibility. The trim cover is formed with a first edge that is attached along a length of the first retainer, abutting the lengthwise concave portion. The trim cover is also provided with a second edge that is spaced apart from and opposing the first edge. The second edge of the trim cover is attached along a length of the second retainer and spaced from the lengthwise body portion to provide clearance for the lengthwise concave portion of the first retainer.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
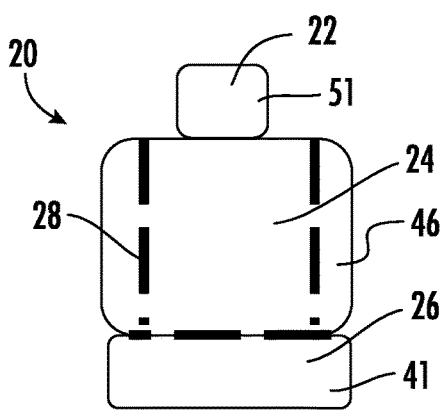
FIG. 1 illustrates a front elevation view of a vehicle seat assembly according to an embodiment.

FIG. 1 illustrates a vehicle seat assembly 20 according to an embodiment. The vehicle seat assembly 20 is provided with a seat bottom 26 adapted to be mounted to a vehicle floor. The vehicle seat assembly 20 may be provided in any row of a vehicle. The vehicle seat assembly 20 may also be employed in any type of vehicle, including land vehicles, watercrafts, aircrafts, or the like. Alternatively, the seat assembly 20 may be any seat assembly, such as an office chair, furniture, a dentist chair, or the like. The vehicle seat assembly 20 includes a seat back 24 extending upright from the seat bottom 26. The vehicle seat assembly 20 may also include a head restraint 22 extending above the seat back 24.

The seat bottom 26, the seat back 24 and the head restraint 22 each include a trim cover 41, 46, 51. The trim covers 41, 46, 51 are sized to extend over and conceal a frame, cushioning and internal components of the seat bottom 26, the seat back 24 and the head restraint 22. Each trim cover 41, 46, 51 provides a comfortable seating surface and may include ornamentation, styling, and the like to visually enhance the utilitarian and comfort features of the seat assembly 20.

Each of the trim covers 41, 46, 51 is formed with an opening to be installed over the associated seat component 26, 24, 22. During installation, the opening is closed, thereby providing a seam 28 along the seat component. Typically, the openings are closed by lengthwise fasteners, such as zippers. Due to the lack of ornamentality of zippers, the prior art has often located the seams along regions that are out of ordinary view during passenger seating and transport. For example, the prior art often orients the seams along a rear region of the seat bottom 26, along a lower region of the seat back 24 and along an underside of the head restraint 22. By placing the seams in regions that are generally out of sight, the lengthwise fasteners are also, hard to reach, and therefore add difficulty to the installation of the trim cover.

The seams 28 of the seat assembly 20 in FIG. 1 include a lengthwise fastener that is ornamental. For example, the seams 28 provide the ornamental appearance of piping. Piping is a lengthwise element that is sewn into decorative seams of seat assemblies, often between a central panel and laterally outboard panels to provide an ornamental separation between different zones, which may have different materials, cushion thicknesses, and other features. Since the seams 28 provide an ornamental appearance of piping, the seams can be located at visible regions upon the seat assembly 20 that are easy to reach during installation. In the depicted embodiment, seams 28 are located adjacent an attachment of the seat back 24 and the seat bottom 26, as well as on the seat back 24 separating the seat back seating surface into three panels.

Figure 2:
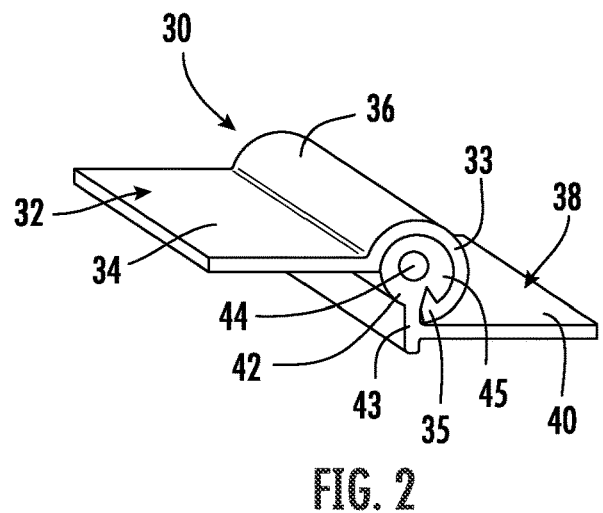
FIG. 2 illustrates a front perspective view of a portion of a lengthwise fastener of the vehicle seat assembly of FIG. 1 according to an embodiment.
Figure 3:
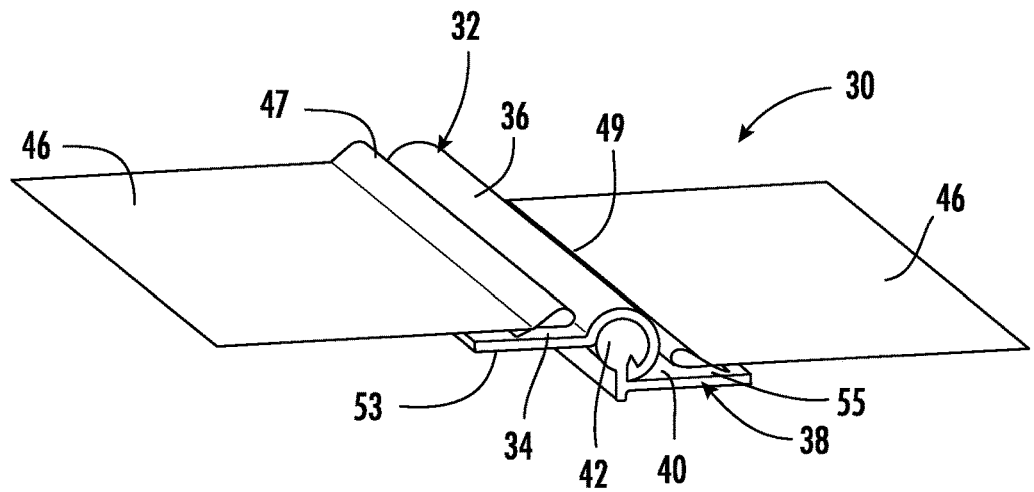
FIG. 3 illustrates a front perspective view of a portion of a seat cover of the vehicle seat assembly of FIG. 1 in cooperation with the lengthwise fastener of FIG. 2, according to another embodiment.

Referring to FIG. 2-3, a lengthwise fastener 30 is illustrated. The lengthwise fastener 30 is provided with a first retainer 32 and a second retainer 38. The first retainer 32 has a rectangular lengthwise extended portion 34 for attachment to the trim cover 46. The first retainer 32 also has a lengthwise concave portion 36 for fastening to the second retainer 38. The lengthwise concave portion 36 has a round cross-section with an arc range of at least 180 degrees, and in the illustrated embodiment, approximately 270 degrees. The concave portion 36 of the first retainer 32 also has a distal end 33 and a centrally extended projection 35 provided on the distal end 33. The first retainer 32 has a consistent cross section along its length. The first retainer 32 may be formed from a semi-rigid and flexible material, such as an extruded polymer.

The second retainer 38 has a rectangular lengthwise extended portion 40 for attachment to the trim cover 46. The second retainer 38 also has a lengthwise body portion 42 sized to fit within the concave portion 36 of the first retainer 32. The lengthwise body portion 42 has a round cross-section with an arc range of at least 180 degrees, yet up to approximately 270 degrees. The body portion 42 of the second retainer 38 is connected to the lengthwise extended portion 40 by an intermediate portion 43 to space the body portion 42 away from the extended portion 40 of the second retainer 38. The intermediate portion 43 is oriented perpendicular to the extended portion 40. This arrangement offsets the lengthwise portions 34, 40 of the retainers 32, 38 such the lengthwise portions 34, 40 are generally parallel and spaced apart.

A recess 45 is formed in the body portion 42 of the second retainer 38 to receive the extended projection 35 of the first retainer 32 when the retainers 32, 38 are fastened together. The second retainer 38 is also provided with an aperture 44 formed lengthwise through the body portion 42 for flexibility of the body portion 42 and consequently, for flexibility of the lengthwise fastener 30. A space between the extended portion 40 and the body portion 42 of the second retainer 38 is less than an overall dimension of a central peak of the extended projection 35 to the outward distal end 33 of the concave portion 36. Therefore, the concave portion 36 and the extended projection 35 are compressed for receipt and fastening with the body portion 42 and recess 45. Once fastened, an interference fit is provided of the concave portion 36 and the projection 35 thereby locking the first retainer 32 and the second retainer 38 together.

The lengthwise fastener 30 is utilized to fasten as seam of the trim cover 46 along its length to enclose a component of the vehicle seat assembly 20. Traditional lengthwise fasteners are meant to be a hidden feature in a vehicle seat; however, they can be difficult to hide. Usually, a lengthwise fastener is placed in a hard to reach area of a seat. The lengthwise fastener 30 provides an ornamental appearance of piping utilized at the seam 28 of the vehicle seat assembly 20. Due to the appearance of piping, the lengthwise fastener 30 can be placed anywhere on the vehicle seat assembly 20 where piping would typically be used. This feature makes the fastener 30 easier to access in manufacturing without compromising the overall appearance of a vehicle seat.

FIG. 3 illustrates the lengthwise fastener 30 with a trim cover 46 attached to the first retainer 32 and the second retainer 38. The trim cover 46 can be used for the head restraint 22, the seat back 24, or the seat bottom 26 of the vehicle seat assembly 20. The trim cover 46 is provided with a first edge 47 attached along the lengthwise extended portion 34 of the first retainer 32 and abutting the lengthwise concave portion 36. The trim cover 46 is also provided with a second edge 49 that is spaced apart from and opposing the first edge 47. The second edge 49 is attached to the lengthwise extended portion 40 of the second retainer 38 and spaced apart from the lengthwise body portion 42 to provide clearance for the lengthwise concave portion 36 of the first retainer 32.

The trim cover 46 is formed from a fabric or textile material. Cut edges 53, 55 of the material can be concealed by folding the trim cover 46 to provide folded edges 47, 49 that are exposed along the concave portion 36 of the lengthwise fastener 30. The edges 47, 49 are fastened to the extension portions 34, 40 respectively by a stitching, adhesives, or the like.

Figure 4:
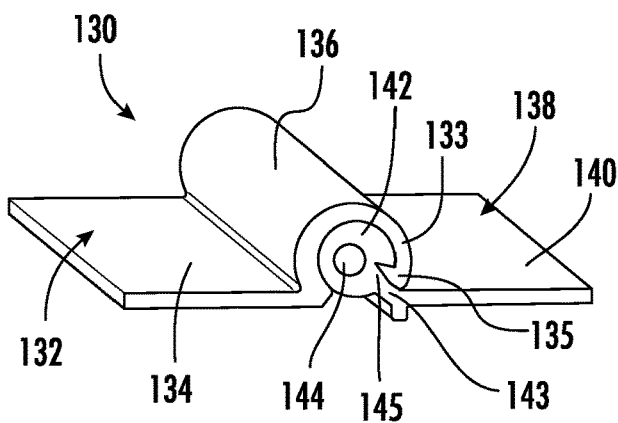
FIG. 4 illustrates a front perspective view of a portion of a lengthwise fastener of the vehicle seat assembly of FIG. 1 according to another embodiment.

FIG. 4 illustrates a lengthwise fastener 130 according to another embodiment. Similar to the prior embodiment, the lengthwise fastener 130 includes a first retainer 132 and a second retainer 138. The first retainer 132 has a lengthwise extended portion 134 for attachment to the trim cover 46. The first retainer 132 also has a lengthwise concave portion 136 for fastening to the second retainer 138. The lengthwise concave portion 136 has a round cross-section with an arc range greater than 180 degrees. The concave portion 136 of the first retainer 132 also has a distal end 133 and a centrally extended projection 135.

The second retainer 138 has a rectangular lengthwise extended portion 140 for attachment to the trim cover 46. The second retainer 138 also has a lengthwise body portion 142 sized to fit within the concave portion 136 of the first retainer 132. The lengthwise body portion 142 has a round cross-section with an arc range of at least 180 degrees, yet up to approximately 270 degrees. The body portion 142 of the second retainer 138 is connected to the lengthwise extended portion 140 by an intermediate portion 143 to space the body portion 142 away from the extended portion 140 of the second retainer 138. The intermediate portion 143 is oriented at an obtuse angle relative to the extended portion 140. This arrangement aligns the lengthwise portions 134, 140 of the retainers 132, 138 such the lengthwise portions 134, 140 are spaced apart and coplanar.

A recess 145 is formed in the body portion 142 of the second retainer 138 to receive the extended projection 135 of the first retainer 132 when the retainers 132, 138 are fastened together. The second retainer 138 is also provided with an aperture 144 formed lengthwise through the body portion 142. A space between the extended portion 140 and the body portion 142 of the second retainer 138 is less than an overall dimension of a central peak of the extended projection 135 to the outward distal end 133 of the concave portion 36. Therefore, the concave portion 136 and the extended projection 135 are compressed for receipt and fastening with the body portion 142 and recess 145. Once fastened, an interference fit is provided of the concave portion 136 and the projection 135 thereby locking the first retainer 132 and the second retainer 138 together.

Figure 5:
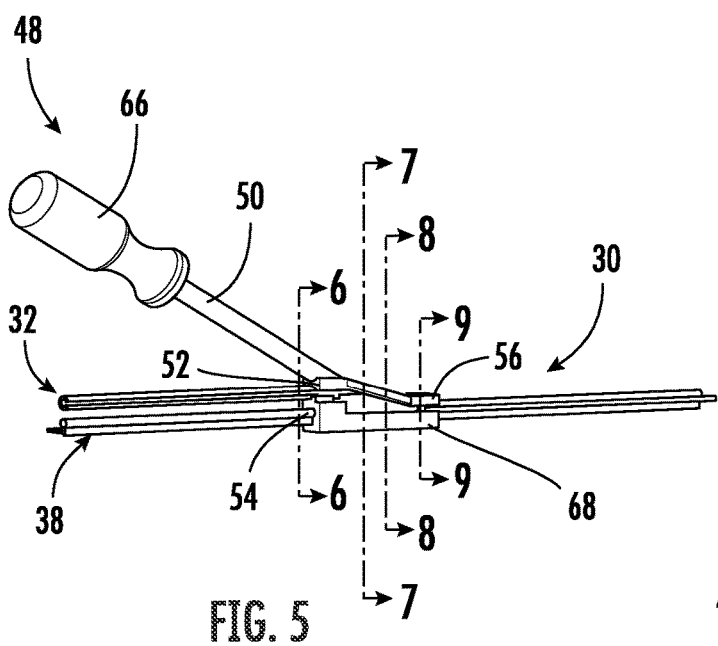
FIG. 5 illustrates a front perspective view of a fastener tool in cooperation with the lengthwise fastener of FIG. 2.

Referring to FIG. 5, a fastener tool 48 is shown for fastening the first retainer 32 to the second retainer 38. The fastener tool 48 has a handle 66, a shank 50 extending from the handle 66, and a tool body 68. The tool body 68 includes a first inlet 52, a second inlet 54, and a single outlet 56. FIGS. 6-9 illustrate multiple cross sections of the tool body 68 and the first and second retainers 32, 38, along the length of the tool body 68 in order to demonstrate a process of fastening the first retainer 32 with the second retainer 38 using the fastener tool 48.

Figure 6:
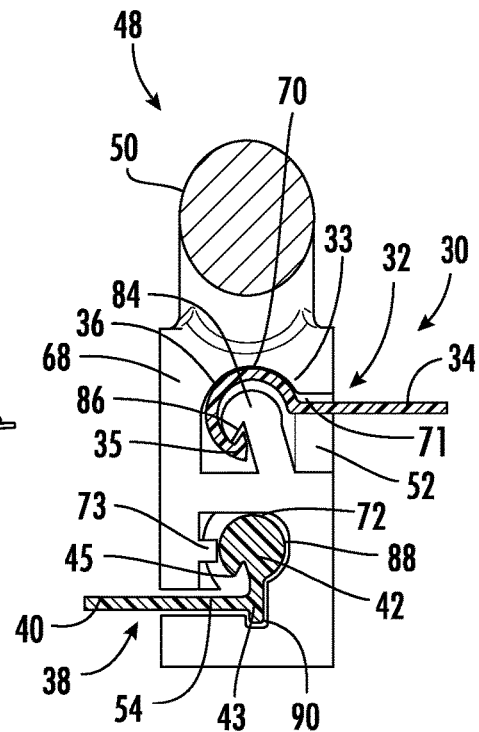
FIG. 6 is a section view of the fastener tool and the lengthwise fastener of FIG. 5 taken along section line 6-6 in FIG. 5.

Referring specifically to FIGS. 5 and 6, the first inlet 52 is sized to receive the first retainer 32 of the lengthwise fastener 30 into a first guide 70. The second inlet 54 is sized to receive the second retainer 38 of the lengthwise fastener 30 into a second guide 72. Upon receipt of the first retainer 32 and the second retainer 38, the tool 48 is manually translated along the length of the lengthwise fastener 30. The first guide 70 and the second guide 72 converge as illustrated sequentially from FIGS. 6 to 9, and intersect as a common guide 70, 72 in FIG. 9. As the first retainer 32 and the second retainer 38 converge on the common guide 70, 72, the retainers 32, 38 are fastened and egress the tool body 68 at the single outlet 56 of the fastened lengthwise fastener 30.

As illustrated in FIG. 6, the first retainer 32 passes through the first inlet 52 of the tool body 68; and the second retainer 38 passes through the second inlet 54 of the tool body 68. The retainers 32, 38 are movable relative to one another by the plurality of guides 70, 72. The first guide 70 is used to move the first retainer 32 to converge to the second guide 72 and the second retainer 38. The first guide 70 has a channel 71 about a body portion 84 with a similar shape to the body portion 42 of the second retainer 38, only smaller to provide clearance. The body portion 84 of the first guide 70 fits within the concave portion 36 of the first retainer 32. The first guide 70 has a recess 86 formed in the body portion 84 sized to receive the extended projection 35.

The second guide 72 includes a channel 88 provided with a slot 90 in one lateral side sized to permit the intermediate portion 43 of the second retainer 38 to pass through. The second guide 72 partially encloses the second retainer 38 in the channel 88 around the body portion 42. The channel 88 is oversized relative to the body portion 42 of the second retainer to minimize friction. The guide 72 also has an alignment projection 73 that extends to the body portion 42 of the second retainer 38 above the recess 45 of the body portion 42 to maintain alignment of the body portion 42 within the channel 88.

Figure 7:
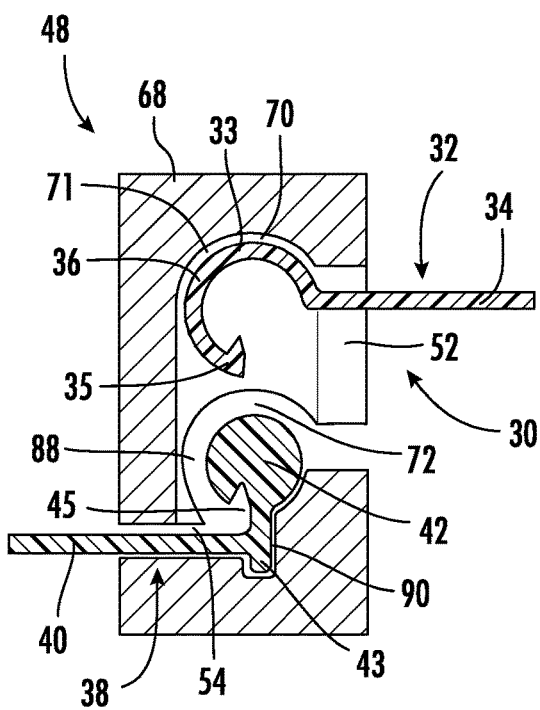
FIG. 7 is a section view of the fastener tool and the lengthwise fastener of FIG. 5 taken along section line 7-7 in FIG. 5.
Figure 8:
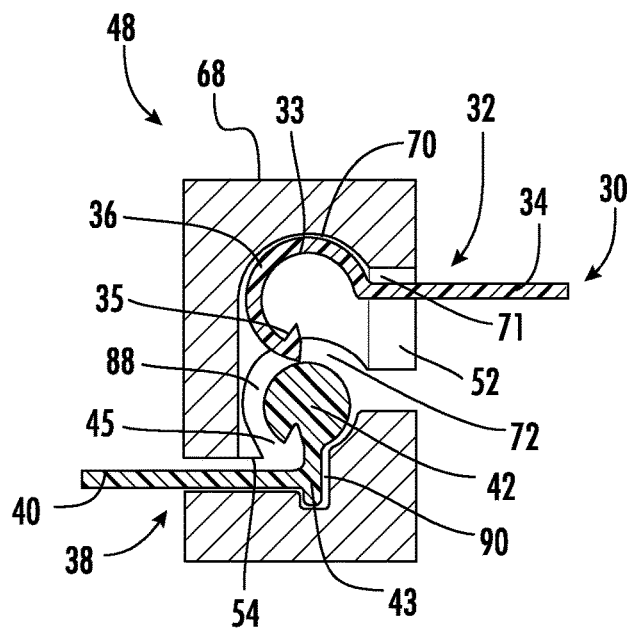
FIG. 8 is a section view of the fastener tool and the lengthwise fastener of FIG. 5 taken along section line 8-8 in FIG. 5.
Figure 9:
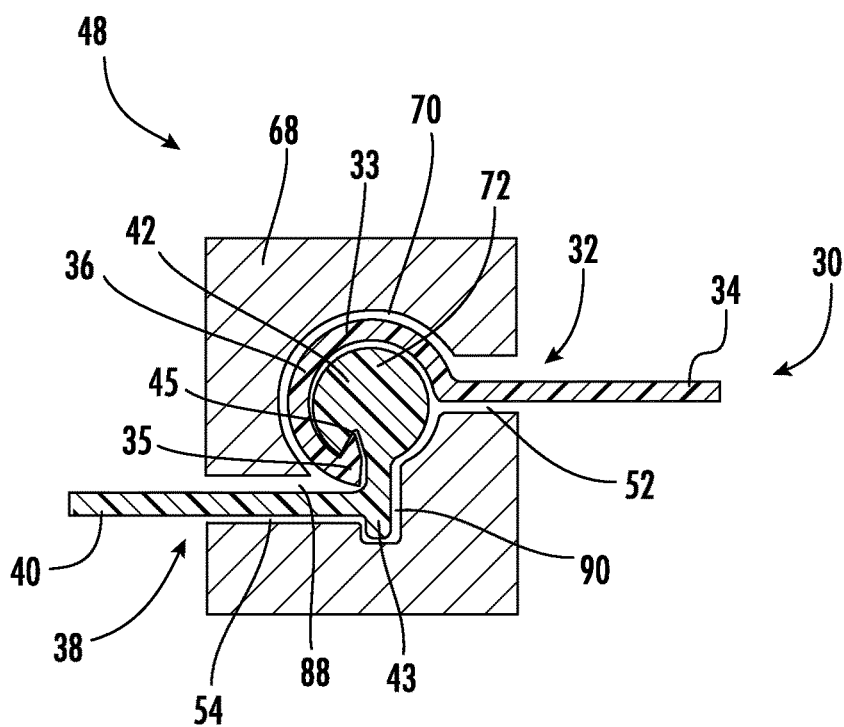
FIG. 9 is a section view of the fastener tool and the lengthwise fastener of FIG. 5 taken along section line 9-9 in FIG. 5.

FIGS. 6-9 sequentially illustrate the process of the retainers 32, 38 converging. As the fastener tool 48 moves, the retainers 32, 38 converge and engage with one another as the first guide 70 is ramped or declined to intersect with the second guide 72. In FIG. 6, the retainers 32, 38 are placed in the tool body 68 on the guides 70, 72. In FIG. 7, the retainers 32, 38 begin to converge. In FIG. 8, the retainers 32, 38 have moved closer together and are in initial contact. Finally, in FIG. 9, the retainers 32, 38 are fastened together as the concave portion 36 deflects about the body portion 42, and then retracts into locked engagement illustrated in FIG. 9.

Figure 10:
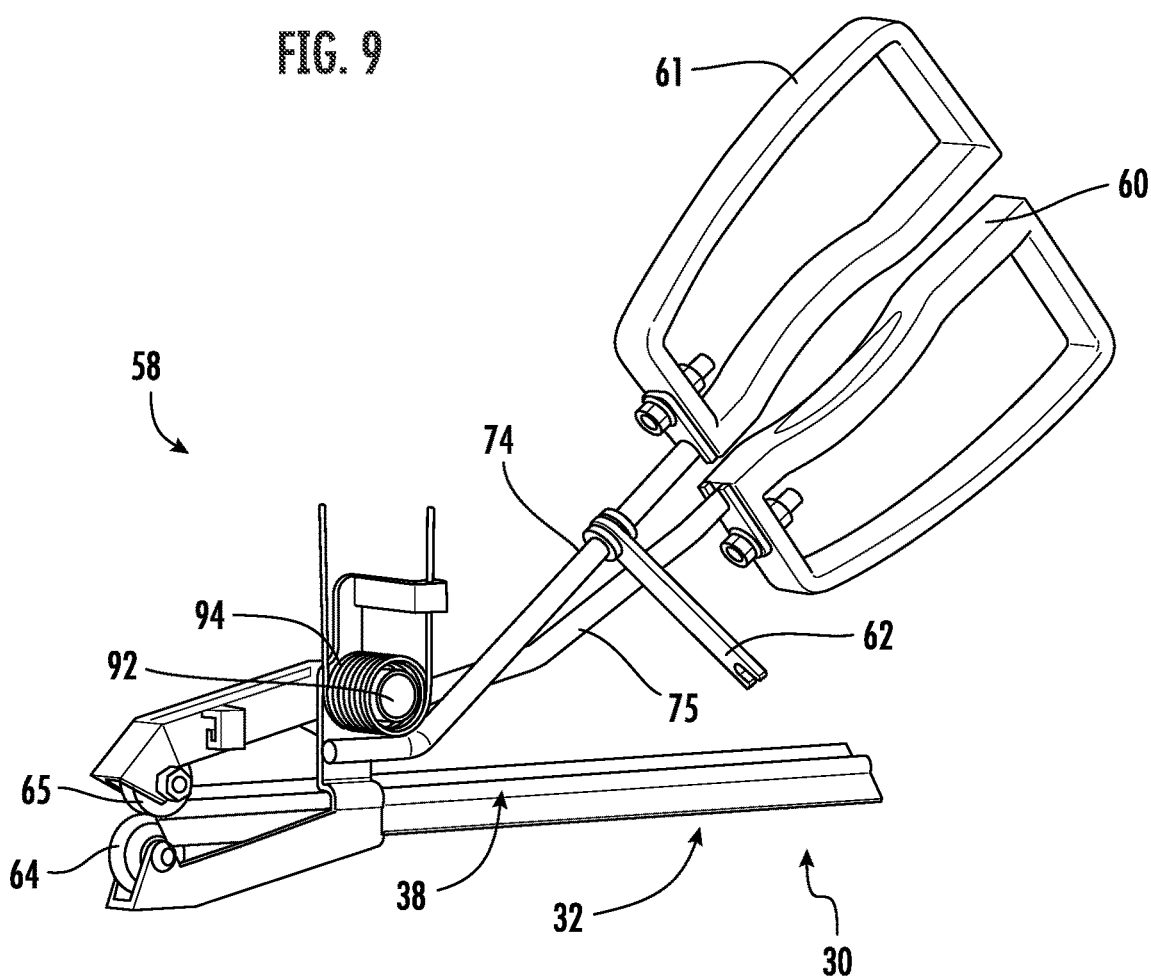
FIG. 10 is a front perspective view of a fastener tool in cooperation with the lengthwise fastener of FIG. 2 according to another embodiment.
Figure 11:
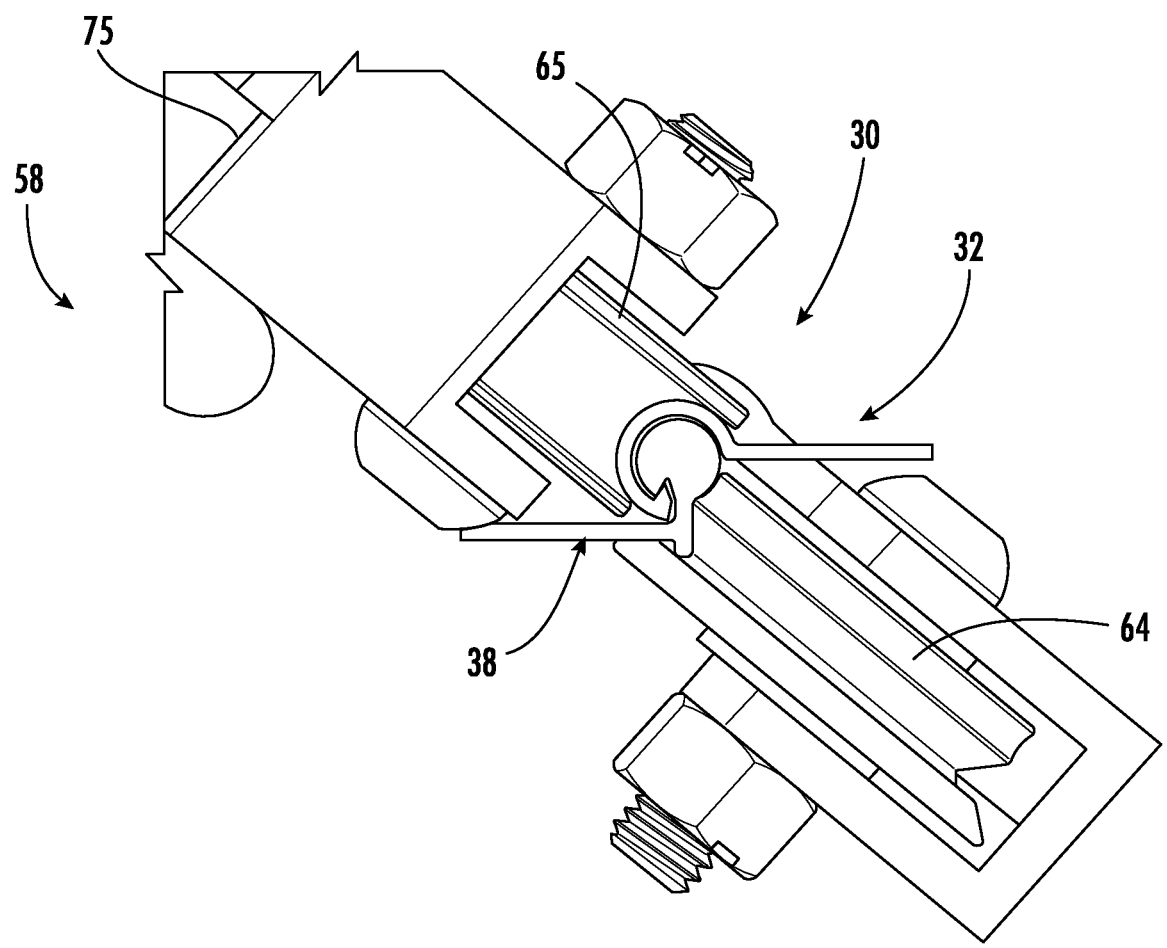
FIG. 11 is an enlarged end view of the fastener tool of FIG. 10.

A fastener tool 58 is shown in FIG. 10 according to another embodiment. The fastener tool 58 is provided with a pair of handle portions 60, 61. A pair of levers 74, 75 are each connected to one of the handle portions 60, 61. The levers 74, 75 are pivotally connected to each other at a pivotal connection 92 in order to open and close to receive the lengthwise fastener 30. The pivotal connection 92 is oriented at an intermediate position along the levers 74, 75. A spring 94 is oriented about the pivotal connection 92. The spring 94 cooperates with the pair of levers 74, 75 to urge the levers 74, 75 to converge absent a manual force.

A pair of rollers 64, 65 are each connected for rotation to a distal end of one of the levers 74, 75. The rollers 64, 65 cooperate with each retainer 32, 38 as the tool 58 is translated along a length of the lengthwise fastener 30. The rollers 64, 65 minimize friction between the fastener tool 58 and the retainers 32, 38. FIG. 10 illustrates the first retainer 32 and the second retainer 38 placed in the fastener tool 58. Upon insertion, the user manually grasps the handle portions 60, 61 to close the rollers 64, 65 upon the retainers 32, 38 with assistance from the spring 94. As the rollers 64, 65 are converged upon the retainers 32, 38, the retainers 32, 38 are fastened together. The user then, manually translates the fastener tool 58 along the length of the retainers 32, 38 to fasten the fastener 30.

The fastener tool 58 is also provided with a locking link 62. The locking link 62 can be propped between the levers 74, 75 in an open position to resist the spring 94 and maintain the levers 74, 75 in the open position. The fastener tool 58 is spring loaded so that when the locking link 62 is unhooked, the fastener tool automatically closes on the first retainer 32 and the second retainer 38.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A lengthwise fastener to fasten a trim cover along a seam and to provide piping exposed along the seam, the lengthwise fastener comprising:
    a first retainer with a lengthwise extended portion and a lengthwise concave portion; and
    a second retainer with a lengthwise extended portion and a lengthwise body portion sized to fit within the lengthwise concave portion of the first retainer; and
    wherein the lengthwise body portion of the second retainer is connected to the lengthwise extended portion of the second retainer by an intermediate portion to space the lengthwise body portion of the second retainer away from the concave portion of the first retainer.

2. The lengthwise fastener of claim 1, wherein the lengthwise concave portion has a distal end and a centrally extended projection provided on the distal end.

3. The lengthwise fastener of claim 2, wherein a recess is formed along the lengthwise body portion, sized to receive the extended projection of the first retainer.

4. The lengthwise fastener of claim 1, wherein the second retainer of the lengthwise fastener is provided with an aperture through the lengthwise body portion for flexibility.

5. A method of fastening the lengthwise fastener of claim 1, the method comprising:
    receiving the first retainer in a first guide of a fastener tool;
    receiving the second retainer in a second guide of the fastener tool;
    closing the fastener tool to engage the first retainer to the second retainer; and
    moving the fastener tool along a length of the first retainer and the second retainer to fasten the first retainer to the second retainer.

6. The method of claim 5, further comprising locking the fastener tool in an open position to receive the first retainer and the second retainer.

7. The method of claim 5 further comprising unlocking the fastener tool prior to closing the fastening tool.

8. A fastener tool comprising:
    a first guide sized to receive a first retainer with a lengthwise extended portion and a lengthwise concave portion of a lengthwise fastener to fasten a trim cover along a seam and to provide piping exposed along the seam for translation of the first guide relative to the first retainer; and
    a second guide sized to receive a second retainer with a lengthwise extended portion and a lengthwise body portion sized to fit within the concave portion of the first retainer for translation of the second guide relative to the first guide; and
    wherein the first guide and the second guide of the fastener tool converge so that translation of the first retainer and the second retainer along the first guide and second guide directs the first retainer into fastened engagement with the second retainer.

9. The fastener tool of claim 8, further comprising a first inlet of the first guide to receive the first retainer and a second inlet of the second guide to receive the second retainer.

10. The fastener tool of claim 9, further comprising a single outlet of the combined first guide and the second guide.

11. The fastener tool of claim 8, wherein the first guide further comprises at least one roller to cooperate with the first retainer; and
    wherein the second guide further comprises at least one roller to cooperate with the second retainer.

12. The fastener tool of claim 8, wherein the first guide and the second guide are movable relative to each other.

13. The fastener tool of claim 8, further comprising a locking mechanism that moves between an open position and a closed position to permit the fastener tool to open and close.

14. The fastener tool of claim 8 wherein the lengthwise concave portion has a distal end and a centrally extended projection provided on the distal end.

15. The fastener tool of claim 14, wherein a recess is formed along the lengthwise body portion, sized to receive the extended projection of the first retainer.

16. A trim cover assembly for a seat comprising:
a trim cover for a seat bottom, a seat back or a head restraint; and
the lengthwise fastener of claim 1 attached along a seam of the trim cover.

17. The trim cover assembly of claim 16,
wherein the trim cover is formed with a first edge that is attached along a length of the first retainer, abutting the lengthwise concave portion; and
wherein trim cover is formed with a second edge that is spaced apart from and opposing the first edge, that is attached along a length of the second retainer and spaced from the lengthwise body portion of the second retainer to provide clearance for the lengthwise concave portion of the first retainer.

18. A seat assembly comprising:
a seat bottom;
a seat back extending upright from the seat bottom; and
the trim cover of claim 16 disposed over the seat bottom or the seat back.

19. A seat assembly comprising:
a seat bottom;
a seat back extending upright from the seat bottom;
a head restraint oriented above the seat back;
a trim cover disposed over the seat bottom, the seat back, or the head restraint;
a lengthwise fastener to fasten the trim cover along a seam and to provide piping exposed along the seam;
a first retainer with a lengthwise extended portion and a lengthwise concave portion with a round cross-section with an arc of at least 180 degrees and a centrally extended projection provided on a distal end of the concave portion;
a second retainer with a lengthwise extended portion, an intermediate portion extending from the lengthwise extended portion, and a lengthwise body portion with an aperture lengthwise therethrough for flexibility, the body portion connected to the intermediate portion, spaced apart from the lengthwise extended portion and sized to fit within the concave portion of the first retainer so that the distal end of the concave portion is received between the body portion and the lengthwise extended portion;
wherein the trim cover is formed with a first edge that is attached along a length of the first retainer, abutting the lengthwise concave portion; and
wherein trim cover is formed with a second edge that is spaced apart from and opposing the first edge, that is attached along a length of the second retainer and spaced from the lengthwise body portion to provide clearance for the lengthwise concave portion of the first retainer.

20. A lengthwise fastener to fasten a trim cover along a seam and to provide piping exposed along the seam, the lengthwise fastener comprising:
a first retainer with a lengthwise extended portion and a lengthwise concave portion; and
a second retainer with a lengthwise extended portion and a lengthwise body portion sized to fit within the lengthwise concave portion of the first retainer; and
wherein the second retainer of the lengthwise fastener is provided with an aperture through the lengthwise body portion for flexibility.

* * * * *